May 29, 1934.   H. CATRON   1,960,771
SWITCH
Filed May 11, 1933   2 Sheets-Sheet 1

Inventor:
Harold Catron
By Mawrjackson Boucher Dennen
Att'ys.

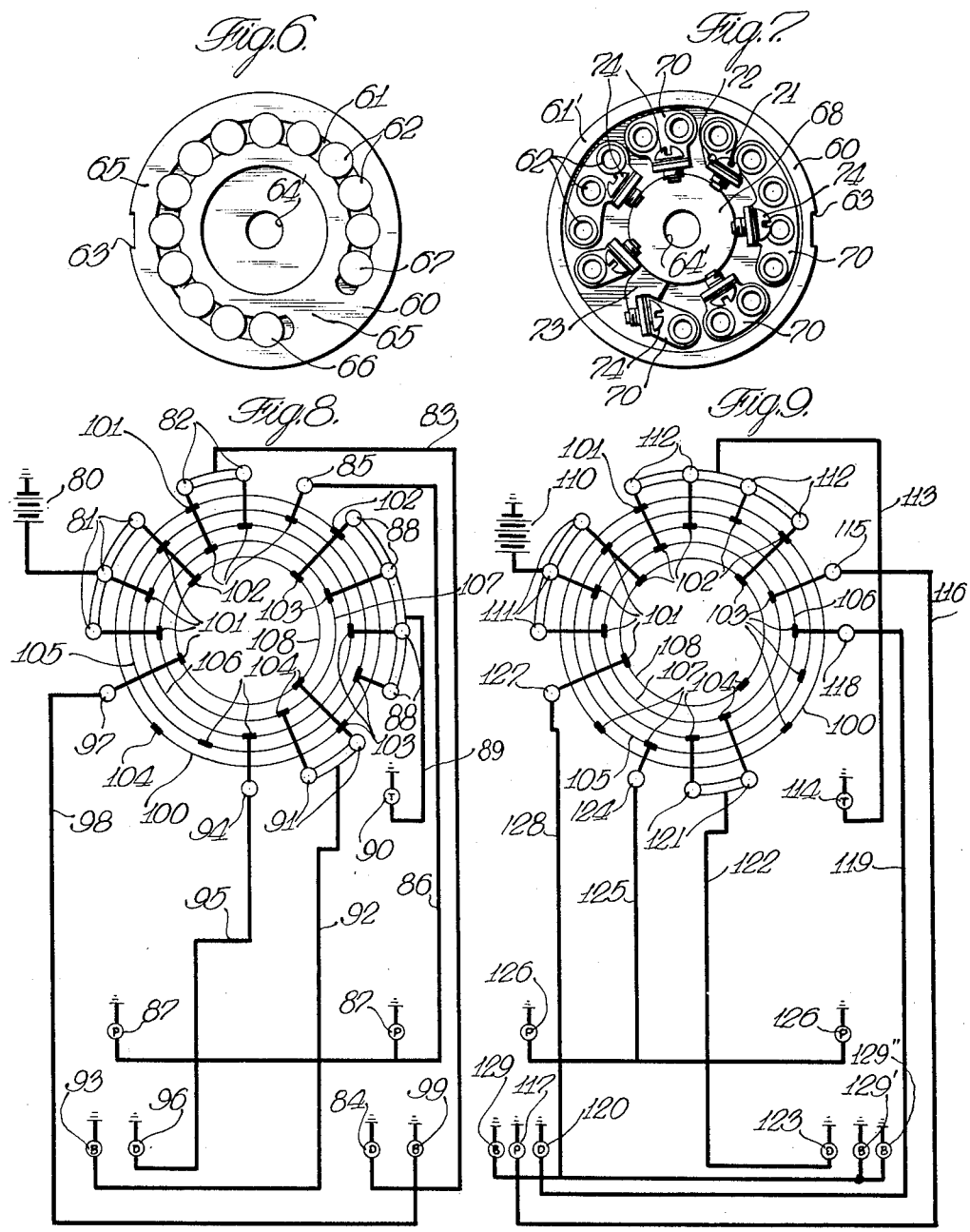

Patented May 29, 1934

1,960,771

UNITED STATES PATENT OFFICE 1,960,771

SWITCH

Harold Catron, Logansport, Ind., assignor to E-B-M Manufacturing Co., Logansport, Ind., a corporation of Indiana Application May 11, 1933, Serial No. 670,399

22 Claims. (Cl. 200—11)

This invention relates to switches, and more particularly to switches for use in vehicle lighting systems and the like.

In its preferred embodiment, the present invention is directed to a steering column type of switch for automotive vehicles and the like which controls the various light circuits carried by such a vehicle. This switch is preferably disposed at the lower end of the steering column, and is actuated by control means mounted adjacent the steering wheel and extending downwardly through the steering column.

In switches of the type now in use, the shifting from one switch circuit to a second switch circuit is accompanied by an interval during which no lights are illuminated, during which interval the contact arm of the switch is moving from one switch contact to another switch contact. This is undesirable, since if the interval be prolonged for any reason, the driver of the vehicle is without adequate illumination to enable him to operate the vehicle properly.

Further, it is customary in switches of the present type to provide only four switch positions, namely, off, parking, dim and bright positions. The lights when dimmed to pass an oncoming vehicle, do not ordinarily provide sufficient illumination for the driver to proceed safely if the vehicle is traveling at any considerable speed.

Another objection to switches of the type now in use is that the switch contacting means is not positively held in fixed position when snapped from one position to another, and consequently the switch may be very easily disengaged by accidental contact with a part of the driver's clothing, and also, must be carefully moved from one switch position to the next in order to assume the positions desired by the operator.

These operations and the care entailed in thus attending to the switching of the lights for a vehicle of this type are hazardous to the operator of the vehicle, since his attention is distracted from driving the vehicle.

It is therefore an object of the present invention to provide a lighting switch for automotive vehicles which maintains the lights illuminated during shifting of the switch lever, thus eliminating blind driving during the change from one switch position to another.

Another object of the present invention is to provide an intermediate switch position between bright and dim positions which I preferably term "passing" position, used when the driver is approaching and passing an oncoming vehicle, in which position of the switch the inner head light is dimmed to prevent blinding the driver of the oncoming vehicle, while the outer headlight remains bright to enable the operator to have a clear view of the side of the road and also to provide illumination for some distance ahead of the vehicle. I also contemplate providing an additional filament in the outer headlamp for directing the light outwardly toward the side of the road to enable the driver to keep away from the road shoulder.

A still further object of the invention is to provide a switch which positively and resiliently locked in each of its engaged positions, rendering its disengagement impossible except by manual actuation of the switch lever by the driver, and which has the same resistance to rotation in either direction of movement.

Other features and advantages of the present invention, such as the resilient wiping contact provided between the collector ring of the switch assembly and the terminal studs of the switch, the universal mounting of the collector ring within the housing, and the like will be more fully disclosed in the following detailed description, which, taken in connection with the accompanying drawings, will disclose to those skilled in the art the construction and operation of the preferred embodiment of my invention.

In the drawings:

Figure 6 is a bottom plan view of one manner of arranging the terminal studs in the terminal block;

Figure 7 is a top plan view of the terminal stud block disclosed in Figure 6;

Figure 8 is a diagrammatic circuit showing the selective operation of the lights corresponding to different positions of the switch; and Figure 9 is a modified form of circuit diagram corresponding to that disclosed in Figure 8.

Figure 1:
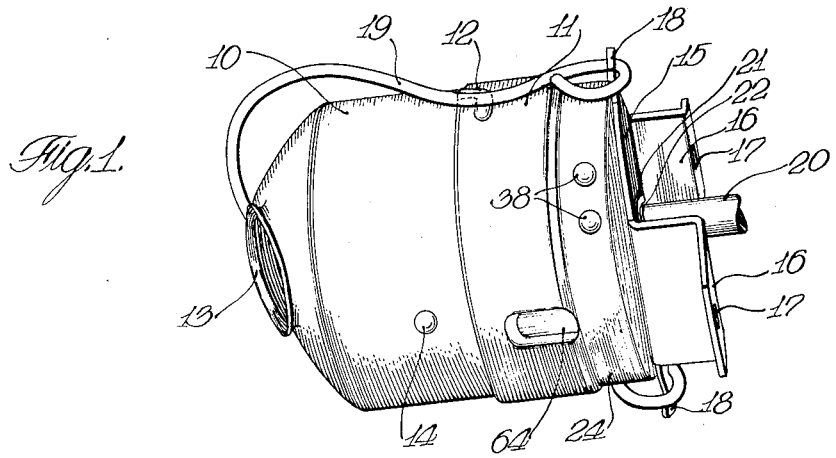
Figure 1 is an elevational perspective view of an assembled switch of the present invention.

Referring now in detail to the drawings, in Figure 1 I have provided a switch comprising two housings 10 and 11, the housings being interengaged by means of the bayonet slots 12 formed on opposite edges thereof.

The lower housing 10 is preferably provided with a flanged opening 13, through which the conductor cables which connect the switch to the various parts of the switch circuit are led into the interior of the housing. The interior wall of the housing 10 is preferably provided with a paper or fabric insulating member, which is held in place by means of the rivet shown at 14. This is to prevent accidental shorting of any of the contactors with the side wall of the housing.

Figure 2:
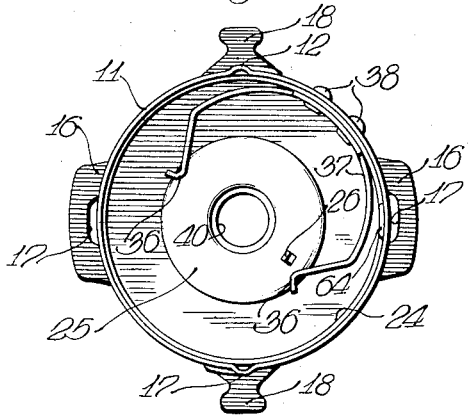
Figure 2 is a plan view of the interior of one portion of the switch housing.

The upper portion of the switch, comprising the housing 11, as shown in Figures 1 and 2, is preferably provided with a flanged end plate 15, having a pair of integrally extending lug members 16, the lug members 16 being provided with outwardly flared portions provided with openings 17 adapted to receive suitable securing means for positioning the switch structure at the lower end of the steering column. The plate 15 is also provided with oppositely extending bail supporting members 18, in the form of extending ears, which are adapted to receive the bail member 19 extending over the end of the housing 10 for positively securing the housing in position after the bayonet engagement 12 has been effected between the housings.

Extending substantially centrally through the lower housing 11 is the operating rod 20, which is adapted to extend upwardly through the steering column to a position adjacent the steering wheel, and is adapted to receive any suitable type of operating lever for rotating the rod 20. An annular washer member 21 is provided on the base of the plate 15, and is adapted to receive the spun over edge of a bushing member 22 which will be described in detail in connection with Figures 3, 4, and 5. The plate 15 is adapted to be secured to the base of the housing 11 in any desired manner such as by riveting, welding or the like.

It is to be understood that ordinarily the operating rod 20 is provided as a standard part of the steering column, and is not a part of the switch proper, the bushing 22 being of such size as to fit over the operating rod carried in the steering column.

Considering now the interior of the housing 11, as shown in Figure 2, the housing is provided with a reduced portion 24, which is adapted to receive the collector ring assembly to be described hereinafter, and is also provided with a substantially annular raised portion 25 which forms a bearing surface for rotation of the collector ring assembly. Struck up from the bearing surface 25 is an integral lug portion 26 which is adapted to act as a stop member for limiting the rotation of the collector ring assembly effected by rotation of the operating rod 20.

Figure 4:
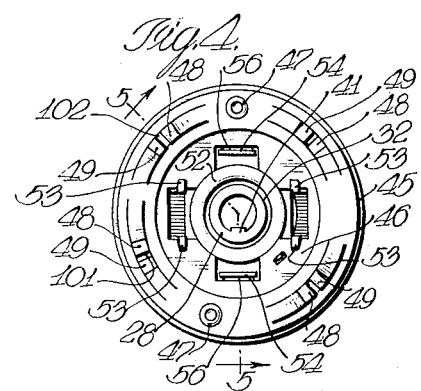
Figure 4 is a top plan view of the collector ring assembly.
Figure 3:
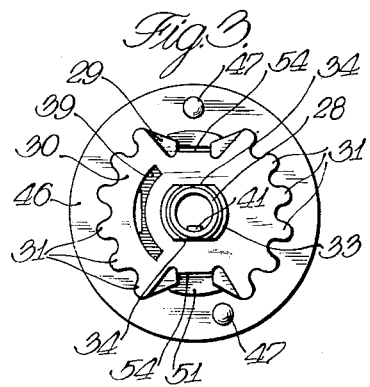
Figure 3 is a bottom plan view of the collector ring assembly.
Figure 5:
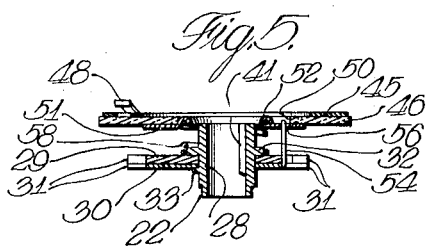
Figure 5 is a sectional view taken substantially on the line 5—5 of Figure 4.

Considering now in detail the collector ring assembly disclosed in Figures 3, 4, and 5, this assembly comprises the bushing member 28, which supports a pair of correspondingly formed sector-shaped members 29 and 30 provided about their periphery with a plurality of serrations or gear teeth 31. The upper surface of the member 29 is adapted to bear against an annular shoulder 32 formed on the bushing 28, and the members are held in fixed position with respect to the bushing by an annular shoulder 33 which engages the lower surface of the member 30. The members 29 and 30 are also nonrotatably mounted upon the bushing member 28 because of the flattened sides 34 of the bushing member, which positively prevents rotation of the members 29 and 30 thereabout. It is thus apparent that rotation of the bushing 28 will result in rotation of the sector like members 29 and 30, and consequent rotation of the gear teeth or serrations 31.

These serrations 31 are adapted to be engaged by corresponding portions 36 of a spring member 37 which is nonrotatably secured within the housing 11 by means of a pair of rivets 38. The spring member has the two extending arms terminating in notched portions 36 which engage between the serrations 31 for positively locking the collector ring assembly in each of its respective positions as it is rotated against the resiliency of the spring member 37 from one position to another. Because of the use of a single spring 37, having the oppositely extending notched ends 36, the resistance to rotation of the switch is equalized in each direction. This is a distinct advantage over prior types of switches utilizing two springs, since in these switches rotation in one direction forces the notched portions of both of the springs outwardly away from the points of support, offering little assistance to rotation, while actuation of the switch in the opposite direction forces the notched portions of both of the springs outwardly toward the point of support, materially increasing the resistance against rotation in this direction. By the use of a single spring, in either direction of rotation one of the spring ends will be forced outwardly away from the point of support, while the other will be forced outwardly toward the point of support. In this manner, uniform resistance against rotation is afforded in both directions.

An arcuate cutaway portion 39 is provided in each of the members 29 and 30 and cooperates with the upstanding lug 26 to limit the rotation of the bushing 28 within the housing 11. The lower portion of the bushing 28 is adapted to extend through an opening 40 formed in the base of the housing 11, and the lower end 22 of the bushing is spun over against the washer 21 to lock the bushing in engagement with the washer, and thus hold the lower surface of the member 30 in engagement with the raised bearing surface 25 of the housing.

The interior of the bushing 28 is provided with a key portion 41, which is adapted to engage in a corresponding keyway formed in the operating rod 20, whereby the operating rod 20 is keyed to the bushing 28 to rotate the bushing against the pressure of the members 36 to any desired position, rotation of the bushing being limited only by the engagement of the lug 26 in the arcuate cutaway portions 39 of the members 29 and 30.

Referring now in detail to the collector ring proper, this comprises the substantially annular ring portion 45 which is mounted upon an insulating base 46 and is suitably secured thereto by means of a pair of rivets 47. The ring member is provided with eight raised contact portions, comprising cooperating pairs of independent spring finger members 48 and 49 which are punched from the surface of the ring member 45 and have their ends curved over to form a smooth contacting surface, each pair of fingers constituting one contact portion. These contact members project above the surface of the ring 45, as clearly shown in Figure 5, and are adapted to engage the terminal studs of the terminal block member, as will be described hereinafter. The raising of the spring fingers 48, 49 provides a resilient contact, having a substantial wiping area, and also, because of the complementary portions 48 and 49 of each contact, providing a more or less universal contacting portion which is adapted to engage the contact at some point at all times.

The contacts are spaced unequally about the periphery of the ring, one pair of the spring fingers being diametrically opposed, while the other pair are out of diametrical alinement. This spacing may be varied, depending upon the type of circuits which the switch is adapted to energize.

The insulating base member 46 is provided with a central cutout portion having four rectangularly extending portions cutout therefrom. This cutout portion is indicated at 50 in Figure 5. The lower surface of the base member 46 is provided with a thin plate member 51, having an annularly raised central portion 52 which engages about and freely receives the inner end of the bushing 28. The plate is secured to the base member 46 by means of oppositely extending turned-over lug members 53 which extend through the opening formed in the base and engage the upper surface thereof, firmly securing the plate 51 to the base.

This serves to provide a rigid engagement of the plate with the base, and provides for moving of the plate upon rocking movement of the collector ring when it successively engages the terminal studs. As will be noted in Figures 3 and 4, the lower sector-like member 30 is provided with normally extending tongue members 54, which are adapted to pass between cutaway portions formed in the upper member at 29, and are adapted to extend through suitable openings 56 formed in the plate member 51. The members 54 thus serve to lock the sector-like assembly in non-rotating position with respect to the collector ring assembly, and thus, upon rotation of the bushing 28, the members 54 are adapted to engage the defining edges of the openings 56 to cause cooperating movement of the collector ring 45. Further, these members 54 serve as guides for limiting the rocking movement of the base member 46 about the bushing.

Normally, the base member 46 is spaced from the member 29 by means of an annular coiled spring member 58, which is biased at its upper end within the annular collar 52 of the plate member 51, and which at its lower end engages about the periphery of the extending shoulder 32 of the bushing 28. This spring normally tends to urge the plate member together with the base member 46 and collector ring 45, upwardly away from the position controlling members 29 and 30, the upward movement being restrained by engagement of the enlarged upper ends of the tongue members 54 with the upper surface of the plate member 51.

It is thus apparent that the collector ring 45 has substantially universal rocking movement with respect to the bushing member 28, and may be resiliently raised and lowered with respect thereto, corresponding to its engagement with particular studs in the terminal block assembly. Further, the inherent resiliency of the spring fingers 48 and 49 forming the contact points of the collector ring also provide for flexibility of contact, and thus a flexible resilient wiping contact is effected.

Considering now Figures 6 and 7, which disclose the terminal block assembly, this terminal block comprises on insulating member formed of bakelite or a similar substance indicated generally by the numeral 60. The block 60 is provided on its lower surface with an annular recessed portion 61, which recessed portion is counterbored to receive a plurality of terminal stud members 62, these stud members being arranged in a predetermined relationship about the periphery of the block 60. The side wall of the block 60 is provided with a keyway 63, which is adapted to be engaged by the corresponding key 64 formed in the housing 11, to secure the terminal block 60 in fixed positive position therein. The block 60 is also provided with a central opening 64', which is adapted to receive a horn control wire extending from a horn button disposed on the steering wheel through the operating rod 20, which is hollow, into the housing 10. The lower surface 65 of the block member 60 is substantially coplanar with the contacting surface of the studs 62, which are recessed in the annular groove 61, and consequently the raised finger members 48 and 49 of the contacts carried by the collector ring will pass thereover in smooth wiping contact, and will pass from the end stud member 66 to the first stud member 67 over the surface 65 without causing axial movement of the collector ring assembly.

However, due to variations in molding the block 60, and tolerances on the thickness of the stud heads, the surfaces are ordinarily not exactly coplanar. For this reason, it is essential that the contact fingers 48 and 49 be resilient, and that the recessed groove 61 in the block be below the surface of the studs 62. Thus, while in any normal operating position, both of the fingers 48 and 49 of a contact portion engage the surface of stud 62, yet when the collector ring is moved from one position to another, one finger of each cooperating pair of fingers leaves the surface of the stud 62, and because of its resiliency, is forced down into the recessed groove 61, which causes it to make contact with the next adjacent stud. At the same time, the remaining finger of each pair is still maintaining contact with the previously engaged stud, although it has moved across the stud in the direction of rotation. Thus, by providing eight independent resilient contact fingers, arranged in pairs, the "blind spot" is eliminated, since the next adjacent stud is engaged by the leading finger of each pair before the other finger is disengaged from the previously engaged stud.

Considering the upper surface of the block member 60, this upper surface is provided with an annular flanged portion 61', which forms a substantially annular recessed portion between the central boss 68 and the flange 61'. Within this recessed portion are provided the terminal members 70, these terminal members 70 being secured to the terminal studs 62 in any desired manner, such as by riveting or spinning over the inner ends of the stud members 62, to lock the terminal members 70 in rigid engagement therewith. The terminal members 70 are formed to engage either one or a plurality of the terminal studs 62, depending upon the particular circuit which is desired. The single terminal member 71 is provided with a depressed portion 72 which is adapted to form keying engagement with the inner surface of the block member 60 to prevent rotation of the terminal member about the stud 62, in order to prevent shorting of this terminal with an adjacent terminal. Similarly, an extending raised portion 73 is provided between other of the terminal members, for preventing rotation of the terminal members. In this manner, the single terminal members are positively locked in position, and consequently there is no danger of shorting of these members by their rotation into contact with an adjacent terminal member. Each of the terminal members 70 is provided with an upstanding portion adapted to receive the screw member 74 for securing a cable or conductor thereto, in order to effect circuit connection to the lighting circuit.

Considering now in detail the circuit diagrammatically shown in Figure 8, this circuit is employed when the contact block shown in Figures 6 and 7 is used. The source of electrical current for the switch is indicated at 80, and may comprise a battery, or the like. Three of the terminals 62 indicated at 81, are connected by a common terminal member, such as a terminal member 70 described in Figure 7, to the battery connection. A pair of terminal connections 82 are connected together by a common terminal member 70, and are also connected through the conductor 83, to the dim filament 84 of the inner head lamp of the vehicle. A single terminal stud 85 is connected through conductor 86 to a pair of parking lamps 87, disposed in any desired position upon the vehicle. Four terminals 88 are connected together by a common terminal member 70, and are also connected through the conductor 89 to the tail lamp 90. A pair of terminal studs 91 are connected through conductor 92 to the bright filament of the outer head lamp of the vehicle. The next adjacent terminal, indicated at 94, is connected through conductor 95 to the dim filament 96 of the outer headlamp. There is then a space provided between the terminal studs, indicated at 65 in Figure 6, and a single terminal stud 97 is connected through conductor 98 to the bright filament 99 of the inner headlamp, thus completing the lamp connections.

In Figure 8, I have indicated, by a plurality of concentric rings, the different positions of the collector ring 45 as it is rotated by the operating rod 20 into the various circuit connections controlled by the switch of the present invention. The outer ring, indicated at 100, corresponds to the position of the contacts when the switch is in its off position. These contacts are indicated in the diagrammatic sketch of Figure 8 by the block members placed upon the ring, contact 101 in the off position of the switch engaging with one of the studs 82 connected to the lamp 84. The second contact 102 is, in the off position of the switch, connected to one of the contact studs 88 connected to the tail lamp of the vehicle. The third contact 103 is connected in the off position of the switch to a contact stud 91 connected to the bright lamp 93 of the outer headlamp. The last contact 104 is not upon any contact stud in the off position.

It is therefore apparent, since none of the members 101, 102, 103 or 104 is connected to the battery terminal, that no current flows to any of the lamps, and therefore the switch is in its off position. Each of the lamps 84, 87, 90, 93, 96 and 99 is grounded to the frame of the vehicle, in order to complete a ground return to the battery 80.

When the contact ring assembly, together with the bushing 28 and the members 29 and 30 is rotated by the rod 20 to engage the next one of the serrations 31 in the notches 36 of the spring retaining member 37, the contacts move to the position shown by the ring 105. In this position, a circuit can be traced from the battery 80 through one of the contact studs 81 and the contact member 101 to the contact member 103 and through the stud 88 and conductor 89 to the tail lamp 90, thus lighting the tail light. Also, in this position the contact 102 on the ring 105 engages the contact stud 85, which is connected through the conductor 86 to the parking lights 87, thus lighting the parking lamps. It is thus apparent that the ring 105 represents the position of the contacts when the switch is in its parking position, with the parking lights 87 and the tail light 90 energized.

When the collector ring is again shifted, by rotation of the rod 20 to its third position, indicated by the ring 106, the contacts assume the position shown in this ring. In this position, a circuit can be traced from the battery 80 through the contact stud 81 and the contact 101 on the ring 106 to the contact 104 which is connected, in this position, to the stud 94, which is connected through conductor 95 to the dim filament 96 of the outer head lamp. Also, a circuit can be traced through the contact 103 to the stud 88 and through conductor 89 to the tail light 90. A third circuit can be traced from the battery through the stud 81, contact 101, and contact 102 to one of the terminal studs 82 and through conductor 83 to the dim filament 84 of the inner headlamp. In this position, therefore, the switch is so disposed as to illuminate the dim filament of each of the head-lamps and the tail light, this corresponding to the dim position of the switch.

As the switch is again rotated through another notch of its position, the contacts on the collector ring assume the position shown by ring 107, in which a circuit can be traced from the battery 80 and the terminal stud 81 to the contact 101. This contact 101 then energizes contacts 102, 103, and 104. Contact 102 is connected to terminal stud 82, and thence through conductor 83 to the dim filament 84 of the inner headlamp. Contact 103 is connected through terminal stud 88 and conductor 89 to the tail lamp 90. Conductor 104 is connected through terminal stud 91 and conductor 92 to the bright filament 93 of the outer headlamp. In this position, therefore, the tail lamp, the dim filament of the inner headlight, and the bright filament of the outer headlight are energized, this corresponding to the "passing" position of the switch.

As the switch is again rotated to its fifth and final position, indicated by ring 108, a circuit can be traced from the battery 80 through terminal stud 81 and contact 102 to the ring 108. From the ring 108, the current passes through contact 101 to terminal stud 97 and through conductor 98 to the bright filament 99 of the inner headlight. Also, current passes through conductor 104, the terminal stud 91, and conductor 92 to the bright filament 93 of the outer headlamp. Also, a circuit can be traced from contact 103 through terminal stud 88 and conductor 89 to the tail lamp 90. Thus, the bright filaments 93 and 99 of the head light and the tail light 90 are energized when the switch assumes this position. This is the bright light or driving position of the switch.

It is thus apparent, that the switch, when in the position exemplified by ring 100, does not illuminate any of the lights. As the collector ring assembly is moved to the position exemplified by ring 105, the tail lamp and the parking lights are energized. As the ring is moved to the position indicated by the ring 106, the tail light, and the dim filaments 84 and 96 of the head lamp are energized. When the ring is moved to its next successive position, exemplified by ring 107, the dim filament of the inner headlight 84 is energized, and the bright filament 93 of the outer head lamp is energized, this corresponding to the "passing position" of the switch. As the switch is moved to its final position, exemplified by ring 108, the tail lamp and the bright filaments of both headlights are energized. As the switch operating rod 20 is reversed in its direction of rotation, the switch successively passes from bright to passing to dim to parking to off positions.

Considering now the circuit diagrammatically disclosed in Figure 9, in this circuit the number of contact studs has been reduced from fourteen to thirteen, and a different type of lighting circuit is provided. In this circuit, the current is derived from a suitable battery indicated at 110. A plurality of contacts 111 are connected to the battery 110 through a common terminal or lug 70, as shown in Figure 7. A second plurality of contacts indicated at 112, are connected through conductor 113 to the tail light 114. A single contact 115 is connected through conductor 116 to the filament 117 of the outer head lamp. Another single contact 118 is connected through conductor 119 to the dim filament 120 of the outer headlamp. A pair of contacts 121 are connected through conductor 122 to the dim filament 123 of the inner headlamp. A single contact 124 is connected through conductor 125 to the parking filaments 126 of the parking lights. A contact 126, adjacent to the contact 111, and spaced from the contact 124, is connected through conductor 128 to the bright filaments 129, 129′ and 129″ of both headlights.

The collector ring assembly used in connection with this circuit is the same as that used in connection with the circuit disclosed in Figure 8, and which is described in detail in Figures 3 to 5, inclusive. This collector ring comprises the four contact spring members indicated by the reference numerals 101, 102, 103, and 104, which are indicated in their respective positions by means of the concentric rings 100, 105, 106, 107 and 108. These rings correspond to the different circuit positions, as explained in detail in connection with Figure 8.

Considering the outer headlamp of this circuit, this headlamp is provided with three independent filaments, a bright filament indicated at 129, a dim filament indicated at 120, and what I term a "passing" filament indicated at 117. The inner headlamp is provided with three filaments also, but filaments 129′ and 129″ are wired together to form the "bright" filament of this lamp. The filament 117 is adapted to project light from the reflector of the headlamp to the outer side of the vehicle, thus lighting up the shoulder of the road and the ditch along the side of the road when the vehicle is passing an oncoming vehicle. This provides the proper illumination, in conjunction with the dimming of the inner headlamp, to enable the operator of the vehicle to ascertain how close the vehicle is proceeding to the edge of the road, and thus to take proper precautions in the guidance of the vehicle, thus avoiding the dangers inherent when both headlights are dimmed, which might result in insufficient illumination to enable the driver to properly view the road.

In the circuit exemplified by the switch disclosed in Figure 9, the switch when in off position has its contacts placed in the positions indicated by the ring 100, with contact 101 engaging contact 112, contact 102 engaging another contact 112, contact 103 being disengaged, and contact 104 being disengaged. In this position, there is no circuit connection to the battery, and consequently no lights are illuminated.

As the switch is moved to its next position, as exemplified by the ring 105, contact 101 moves onto the first contact 111 of the battery. This supplies electrical current to the entire ring, and consequently contact 102, which engages the second contact 112, energizes the tail light 114 through the conductor 113. Also, contact 103 is moved into the position shown in connection with ring 105, but still does not engage any of the circuit contacts. Contact 104 is moved into engagement with terminal 124, which is connected through conductor 125 to the parking filaments 126. Thus, the switch in this position illuminates the tail light and the parking lights.

When the switch is moved to its next operating position, exemplified by ring 106, contact 101 remains on one of the terminals 111 of the battery connection, contact 102 moves to another terminal of the tail light connection, contact 103 moves into engagement with terminal 118, and consequently is connected through conductor 119, to the dim filament 120 of the outer head lamp. Contact 104 moves into engagement with terminal 121, and thus energizes a circuit through conductor 122 to the dim filament 123 of the inner head lamp. In this position, therefore, the switch energizes circuits illuminating the tail light and the dim filaments 120 and 123 of the headlamps. This is the dim position of the switch, used for city driving and the like.

As the switch is moved to its next operating position, indicated by the ring 107, contact 101 still remains in engagement with terminal 111, thus supplying electrical current from the battery 110 to the ring. Contact 102 is now in engagement with the last contact 112 of the tail light circuit. Contact 103 is in engagement with terminal 115, which is connected through conductor 116, to the "passing" filament 117 of the outer headlamp, which directs the light outwardly from the vehicle toward the side of the road. This light may be of an intensity substantially the same as the intensity of the bright lights of the head lamp. Contact 104 is still in engagement with terminal 121, and consequently filament 123 of the inner head lamp is energized through conductor 122. In this position of the switch, the tail light, the dim filament 123 of the inner head lamp, and the passing filament 117 of the outer head lamp are energized, this providing the "passing" position of the switch used when the vehicle is approaching an oncoming vehicle and the operator does not wish to dim his lights, because of the insufficient illumination provided thereby.

The switch is then capable of being moved into its final or driving position, in which contact 101 engages terminal 127 which energizes the bright filament 129 of the outer headlamp and filaments 129′ and 129″ of the inner headlamp through conductor 128. Contact 102 at this time moves into engagement with terminal 111, thus supplying electrical current to the collector ring. Contact 103 moves into engagement with the first terminal 112 of the tail light circuit, thus energizing the tail light 114. Contact 104 moves into an off position, in which it is not in engagement with any of the terminal members. It is therefore apparent, in this position, that the bright filaments of the head lamps will be illuminated, and the tail light 114 will be illuminated, while the remainder of the lighting circuit is unenergized.

It will therefore be apparent that I have provided a circuit, in this figure, which is equally applicable to connection with the switch disclosed in Figures 1 to 5, inclusive, as is the circuit of Figure 8, and in which a particular type of "passing" position of the switch is provided, wherein the driver of the vehicle is fully apprised of the distance that the vehicle is from the side of the road, and thus may properly maintain the vehicle away from the edge of the road. Further, the switch of the present invention, in both embodiments, is of substantial and rigid construction, and cannot be jarred from any of its operating positions, due to the spring engagement in the serrations formed at the periphery of the actuating member.

Further, the provision of a continuous collector ring with raised contacts, which is spring supported upon the operating members, and has substantially universal movement thereabout, together with the inherent resiliency of the spring fingers, provides for a contact engagement which is positive at all times, is maintained in proper condition by the wiping contact of the spring fingers with the lower surfaces of the contact studs, and which, if, because of inaccuracies in molding or the like, which causes the studs to be out of planar alignment, will still produce the proper operating characterstics, because of the independence of the eight resilient contact fingers.

A further advantage of the continuous collector ring provided with the paired individual resilient contact fingers is the elimination of the "blind" spot present in the usual type of switch, whereby one light circuit is continuously energized until another light circuit is selected.

I do not intend to be limited to the exact details shown and described in connection with the illustrated embodiment of my invention but only in so far as defined by the scope and spirit of the appended claims.

I claim:

1. In a switch of the class described having a rotatable shaft, a switch housing, operating means comprising a bushing rotatable in said housing and keyed to said shaft, a pair of superposed sector-like members, means carried by said bushing for securing said members in nonrotative position with respect thereto, and a collector ring independently supported by said sector-like members and adapted to be rotated into a plurality of circuit-establishing positions, said ring having free universal movement with respect to said bushing.

2. In a switch of the class described, a pair of switch housings having interlocking engagement, switch mechanism disposed entirely within one of said housings comprising a plurality of peripherally spaced contact terminals, a collector ring rotatable in said housing and having integral raised contact means, the area of each of said contact means being slightly greater than the spacing of said contact terminals whereby each contact means engages the next adjacent terminal before leaving the previously engaged terminal, and means for effecting rotation of said collector ring into predetermined circuit establishing positions.

3. A collector ring for a switch of the class described comprising an insulating plate, means carried by said plate providing for rotation thereof, a metallic annular ring member secured to one surface of said plate, and a plurality of spaced pairs of opposed integral resilient contact means struck upwardly from said ring member and having smooth contacting surfaces.

4. A collector ring for a switch of the class described comprising an insulating plate, means carried by said plate providing for rotation thereof, a metallic annular ring member secured to one surface of said plate, and integral resilient opposed pairs of contact means struck upwardly from said ring member and having smooth contacting surfaces, said pairs of contact means being unequally spaced about said ring member.

5. A collector ring for a switch of the class described adapted to be actuated by a rotatable shaft, comprising an insulating plate, means carried by said plate providing for rotation thereof by said shaft, said means also providing for universal rocking movement of said plate about said shaft, a metallic annular ring member secured to said plate, and resilient contact means extending upwardly from said ring member and having smooth contacting surfaces, said contact means comprising opposed struck out finger members arranged in spaced pairs about said ring member.

6. In a switch of the class described, a terminal member having a plurality of circumferentially spaced coplanar contact studs, an annular planar collector ring having a plurality of integrally formed resilient contacting means, means for rotating said collector ring to move said contacting means along the surface of said studs, spring means normally urging said ring toward said studs, and means providing for universal rocking movement of said ring about said rotating means.

7. In combination, a switch housing, switch terminals disposed within said housing and connected to external electrical circuits, contacts carried by said terminals, resilient contact means engaging a portion of said contacts, and means for rotating said contact means about said terminals, each of said contact means engaging the next adjacent contact before leaving the previously engaged contact to provide continuous energization of said circuits during switching movement.

8. In combination, in a switch of the class described, operating mechanism comprising a rotatable bushing, a pair of actuating members non-rotatively secured to said bushing, serrations formed in the peripheries of said members, spring means engaging in said serrations for holding said members in operating position, means for rotating said bushing against the pressure of said spring means into different operating positions, said spring means preventing said members from stopping in positions intermediate any of said operating positions, circuit-selecting means carried by and insulated from said members, means normally urging said circuit-selecting means away from said members, and means providing for universal rocking movement of said circuit-selecting means about said members.

9. A collector ring for a switch of the class described having a plurality of spaced contact studs with recesses between said studs, comprising an annular metallic member having integrally formed independent resilient contact fingers extending out of the plane of said member, said fingers being arranged in pairs whereby the leading finger of each pair of fingers engages the next adjacent contact stud before the other finger of said pair leaves the previously engaged stud.

10. In a switch of the class described having a rotating collector ring adapted for selectively engaging a plurality of contact studs, means for resisting rotation of said ring comprising a spring member having a fixed central support and extending notched ends, and means carried by said collector ring engaged by the notched ends of said springs, said notched ends offering uniform resistance to rotation of said ring in either direction.

11. A collector ring for a switch of the class described comprising a metallic annular ring member of uniform breadth having a plurality of contact means formed integrally therewith, each of said contact means comprising a pair of opposed fingers struck up from the surface of said member and having their adjacent edges bent downwardly to provide a smooth contacting surface across both of said fingers.

12. A collector ring for a switch of the class described comprising a metallic annular ring member having a planar surface, circumferentially extending fingers struck up from the surface of said member, said fingers being arranged in opposed pairs, each of said pairs forming a resilient contact means.

13. A collector ring for a switch of the class described comprising a metallic annular ring member having a planar surface, and a plurality of fingers struck up from said surface in opposed pairs and arched to form smooth contact surfaces.

14. Contact means for a switch of the class described comprising a planar metallic member having a plurality of struck up finger portions arranged in pairs, the adjacent edges of the finger portions of each pair being curved downwardly to provide a smooth resilient contact surface.

15. In a switch of the class described, contact means therefor comprising a planar metallic member having a plurality of integrally formed resilient fingers extending above the surface of said member, said fingers being arranged in pairs with the adjacent edges of the fingers of each pair being bent downwardly to provide smooth contacting portions, actuating means for said member, and a plurality of contacts having their contact surfaces in planar alignment, said surfaces being adapted to be selectively engaged upon actuation of said metallic member.

16. A terminal member for a switch of the class described comprising an insulating member having an annular groove in one surface thereof, terminals projecting normally from said groove and having portions disposed in said groove, contact studs securing said terminals to said insulating member and having contact surfaces coplanar with the opposite face of said insulating member, and means formed integral with said insulating member for engaging at least one of said terminals to prevent rotation of said terminal about said stud.

17. A terminal member for a switch of the class described comprising an insulating block member having a series of depressions arranged circumferentially in one face thereof, contact studs mounted in said depressions and having their contact surfaces coplanar with said face, said studs being equally spaced adjacent each other about a major portion of the block member, and terminals disposed in an annular groove in the opposite face of said member and projecting normally to said member, said terminals being secured in position by said studs.

18. A contact assembly for a switch of the class described comprising an insulating plate member having a contact opening, a metallic ring member mounted on said plate member and having spaced raised contact portions, a metallic plate member disposed on the under surface of said insulating member and having projecting means engageable with said insulating member for securing said members together for conjoint movement, and means extending through slots in said plate member for supporting said assembly.

19. A contact assembly for a switch of the class described comprising an insulating plate member having a central opening, and a plurality of pairs of rectangular openings extending outwardly therefrom, a metallic ring member mounted on said plate member and having spaced raised contact portions, a metallic plate member disposed on the under surface of said insulating member and having projecting means engageable with said insulating member for securing said members together for conjoint movement, and means extending through slots in said plate member for supporting said assembly, said means projecting upwardly through one pair of said rectangular openings in said insulating member.

20. In combination, in a switch of the class described, a cylindrical bushing, sector-like means non-rotatively mounted on said bushing, upwardly projecting guide lugs carried by said means, a contact assembly having means receiving said lugs, said last named means being provided with an annular groove adjacent to and surrounding one end of said bushing, and spring means surrounding said bushing and engaged between said groove and said sector-like means.

21. In combination, in a switch of the class described, a contact assembly comprising a metallic collector having spaced raised contact portions, an insulating member for supporting said collector, a rigid plate secured to said insulating member and having a central opening, a pair of actuating members, one of said members having normally extending lugs engaging in guide slots formed in said plate, spring means normally urging said plate and actuating members apart, and a bushing non-rotatively secured to said actuating members for rotating the same.

22. In combination, in a switch of the class described, a contact element, means for supporting said element including a plate member having a pair of opposed slots, actuating means for said element including a pair of upstanding lugs engaging in said slots, said element having limited universal rocking movement with respect to said actuating means, a spring engageable between said plate member and said actuating means, and means for selectively rotating said actuating means.

HAROLD CATRON.